United States Patent [19]
Kitten et al.

[11] Patent Number: 5,795,124
[45] Date of Patent: Aug. 18, 1998

[54] SELF-LOADING MATERIAL HAULER AND DISTRIBUTOR

[75] Inventors: Jerry J. Kitten, Rte. 2, Box 6, Slaton, Tex. 79364; Wayne Hurt, Slaton, Tex.

[73] Assignee: Jerry J. Kitten

[21] Appl. No.: 658,371

[22] Filed: Jun. 5, 1996

Related U.S. Application Data

[60] Provisional application No. 60/000,031, Jun. 8, 1995.

[51] Int. Cl.$^6$ .................................................. B60P 1/36
[52] U.S. Cl. ................ 414/489; 198/735.3; 198/550.12; 414/528; 414/505; 414/492; 414/514; 239/672; 239/681
[58] Field of Search ............ 198/550.12, 735.3; 414/514, 528, 502, 503, 504, 505, 489, 491, 492, 493; 239/657, 672, 681, 682, 677, 673, 664; 241/186.35

[56] References Cited

U.S. PATENT DOCUMENTS

| 131,163 | 9/1872 | Hall . | |
|---|---|---|---|
| 407,742 | 7/1889 | Davis . | |
| 1,463,492 | 7/1923 | Varland . | |
| 1,752,612 | 4/1930 | Owens et al. | 198/735.3 |
| 1,770,650 | 7/1930 | Levin | 198/735.3 |
| 2,754,801 | 7/1956 | Reese | 198/550.12 X |
| 3,209,526 | 10/1965 | Morrow | 198/735.3 X |
| 3,602,404 | 8/1971 | Frank | 414/493 X |
| 3,895,702 | 7/1975 | Newsom | 198/11 |
| 4,356,687 | 11/1982 | Lesslhumer | 56/364 |
| 4,441,848 | 4/1984 | Bailey | 414/439 |
| 4,664,583 | 5/1987 | Gust | 414/528 |
| 5,104,281 | 4/1992 | Corvi | 414/491 X |

FOREIGN PATENT DOCUMENTS

| 528020 | 4/1953 | Belgium | 414/492 |
|---|---|---|---|
| 254438 | 10/1989 | Japan | 414/514 |
| 1625372 | 2/1991 | U.S.S.R. | 239/672 |

*Primary Examiner*—Frank E. Werner
*Attorney, Agent, or Firm*—Wendell Coffee

[57] ABSTRACT

A self-loading vehicle for moving cotton modules or bulk materials such as compost or cotton burrs. The vehicle utilizes a chain conveyor system on a tiltable bed. Long conveyor bars or lugs are attached horizontally to the chains to aid in gripping the material being moved. The chains lie in valleys in the bed, and are separated by ridges. The ridges and valleys help to channel loose bulk material toward the moving chains. Vanes or scrapers on the bottom of the horizontal bars assist in scraping small portions of loose bulk material out of the vehicle. A multi-position spreader on the rear of the bed may be moved down into a position to disperse bulk material, such as fertilizer or compost being spread onto an agricultural field. The spreader is moved up and out of the way for loading bulk material. The vehicle with spreader removed or positioned in its uppermost position is also utilized as a vehicle for transportation of cotton modules.

10 Claims, 3 Drawing Sheets

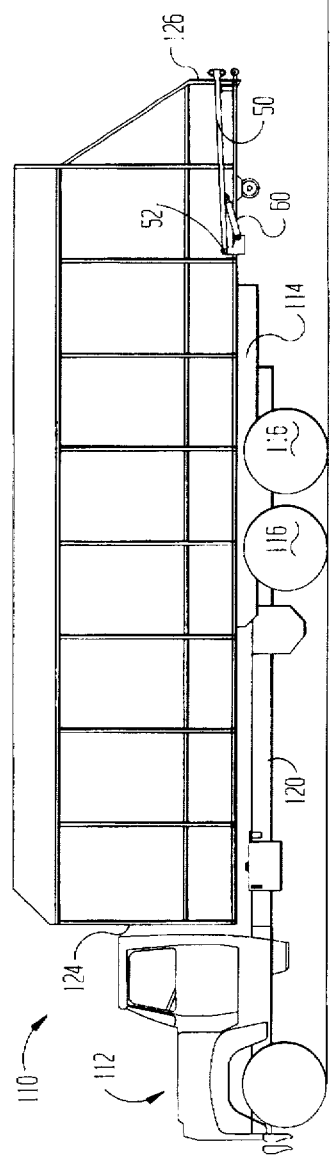
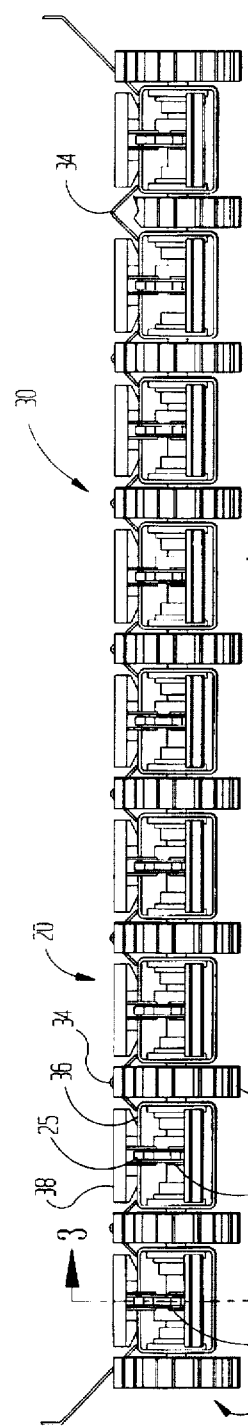
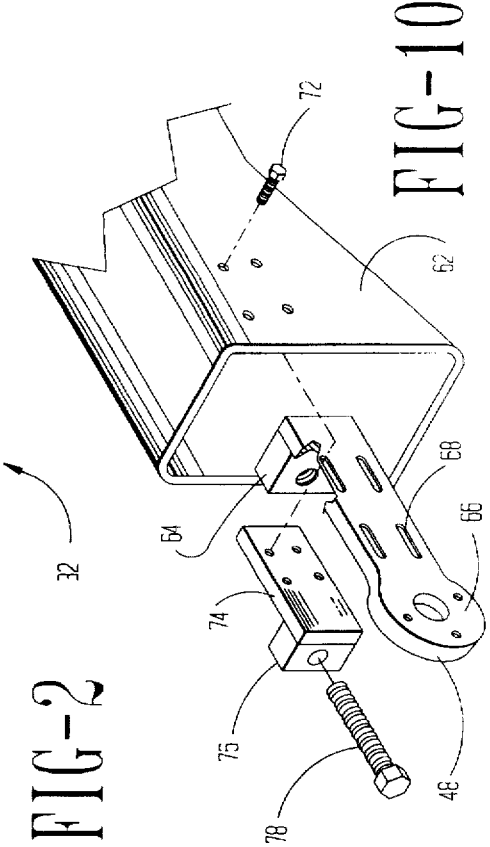
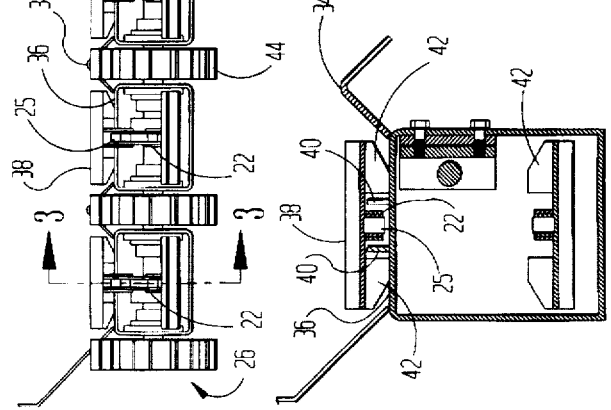

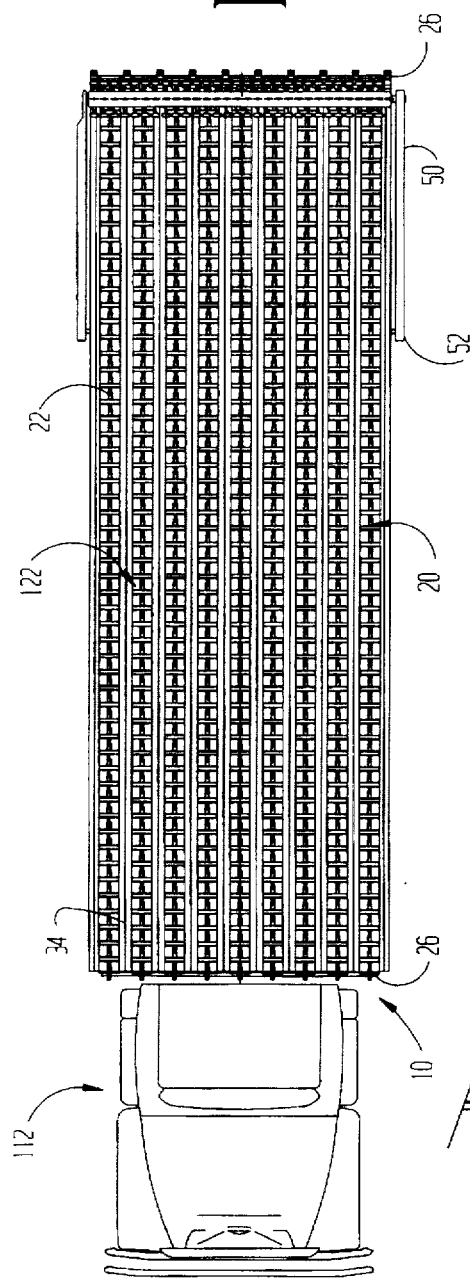
FIG-5
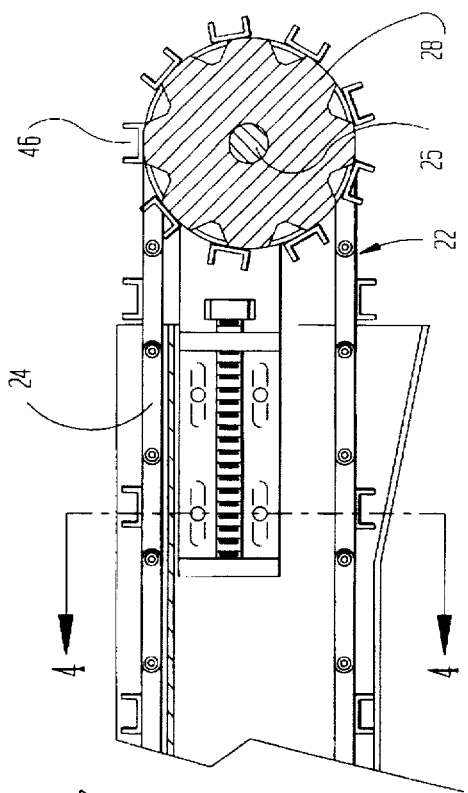
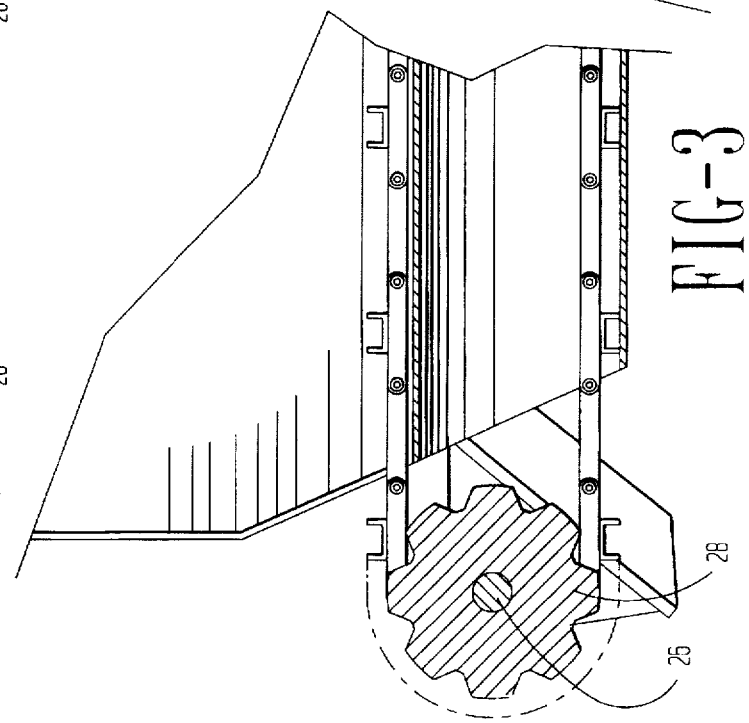
FIG-3

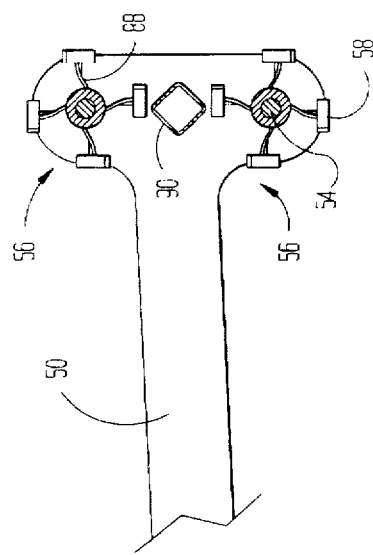
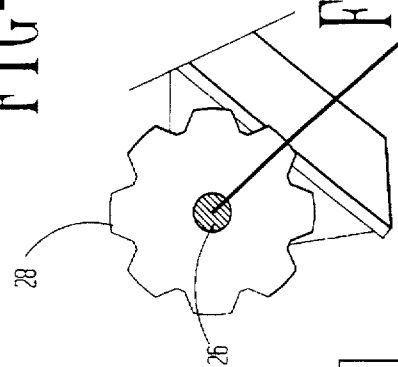
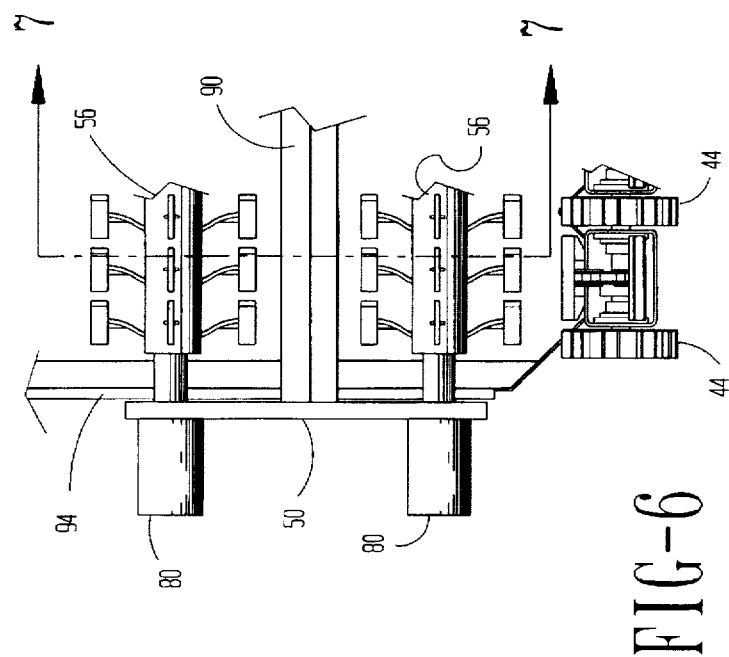
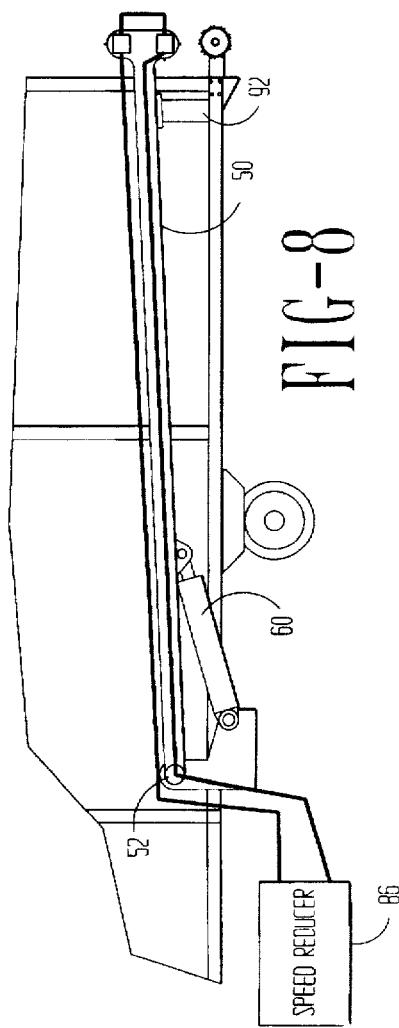
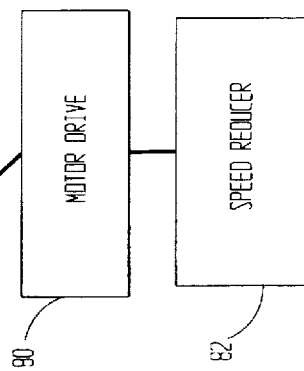

SELF-LOADING MATERIAL HAULER AND DISTRIBUTOR

CROSS REFERENCE TO RELATED APPLICATION

Applicant filed Disclosure Document Number 347,562 on Feb. 8, 1994 which document concerns this application; therefore, by separate paper it has been respectfully requested that the document be retained and acknowledgment thereof made. (MOPEP 1706)

Applicant also filed a Provisional patent application Ser. No. 60/000.031 on Jun. 8, 1995. Applicant relates this application back to said provisional application, and incorporates the contents of said application herein as if set forth in its entirety.

BACKGROUND OF THE INVENTION

(1) Field of the Invention

This invention relates to the hauling of cotton modules and bulk materials and more particularly to picking up compost from a point where it is made, and dispersing compost to cultivated fields after being made. Farmers have ordinary skill in the art to which this invention relates.

(2) Description of the Related Art

After harvesting cotton, a large amount of waste material is left behind. This waste material includes cellular plant material as a major component. The disposal of this trash is a burden. The trash is difficult to dispose of in its raw form, because noxious weed seeds in the trash make it undesirable to spread upon cultivated fields.

Agricultural arts dating back many centuries have taught the composting of waste plant material, to preserve the nutrients in the material. The composted trash forms a desirable material to spread upon the fields. The heat of composting destroys the germination of noxious weed seeds in the compost. After composting, the trash is in a condition to be spread upon the cultivated fields for beneficial results. Composting changes the trash from a burden to a benefit.

The trash from a cotton harvest is accumulated at cotton gins. For composting, it is desirable that large amounts of material be accumulated. It is difficult to gather and distribute compost to cultivated fields.

Before this invention, manure spreaders were known. However, manure is a different product from compost and normally is handled in a different way. Also, manure normally has a higher weight per unit volume than compost.

Many of the owners of cotton gins also own cotton module movers. These are trucks or trailers which have a tilting bed. The bed has a series of chains whereby modules may be loaded onto the trailer. Bailey (U.S. Pat. No. 4,441,848) is an example of a transport for cotton modules. The first page of Bailey recites the development of these units.

Two salient issues arise with respect to cotton module movers used by gins. First, the module movers are costly dedicated resources which are only used during the harvest season; at other times of the year, the module movers go unused. Second, current module movers have difficulty in picking up cotton modules under certain conditions. If the module is not tightly packed, the conveyor chains used to pick up the module may slip and dig a tunnel through the bottom of the module when transporting it into or out of the module mover. When this happens, it is necessary to manually remove the cotton from the module mover with pitchforks.

Varland (U.S. Pat. No. 1,463,492) discloses a combined manure loader and spreader. Varland shows a self-propelled vehicle, propelled by the motor 5. One chain 12 goes from the motor to the ground-engaging wheels, and another chain 22 extends from the motor to a large kicker or beater 59.

Lesslhumer (U.S. Pat. No. 4,356,687) appears to disclose a device for loading grass or hay from a windrow. Lesslhumer has a large kicker with a complex mechanism to raise the windrow and place it on a loading chain or belt.

Newsom (U.S. Pat. No. 3,895,702) discloses a machine for loading a long rick of harvested cotton into a cargo body.

Hall (U.S. Pat. No. 131,163) and Davis (U.S. Pat. No. 407,724) disclose a series of narrow belts, close together, to transport material.

SUMMARY OF THE INVENTION

(1) Progressive Contribution to the Art

Applicant has invented a vehicle for moving cotton modules and loading, transporting, and dispersing bulk materials particularly suited to picking up gin trash and distributing it to cultivated fields.

Basically, applicant's contribution is to provide a vehicle which is somewhat similar to a module mover whereby the compost can be picked up in this manner. A distribution element is added to disperse the compost over the field. The distribution element (also called a "kicker," "beater," or "spreader," can be raised while loading the compost and lowered at the time of distribution.

The distribution element may also be raised (or otherwise moved out of position) sufficiently so that an entire cotton module may be loaded onto the truck. Therefore, a single vehicle serves the dual purpose of (1) hauling modules during the harvest season, and (2) distributing compost the rest of the year.

Applicant's invention also includes a combination of scraper vanes on the chains which load and unload the material, as well as ridges located on the floor inside the truck. This combination acts to ensure that the compost or other bulk material may be unloaded from the truck completely, with none being left behind.

Applicant's invention also uses a variable speed drive on the conveyor drive mechanism within the vehicle. With module movers, under the prior art, it was desirable to have the conveyor drive system for loading and unloading synchronized to the speed of the vehicle. In this manner, an entire cotton module could be loaded in one piece by backing the truck into the module. As the truck backed further, the module would be picked up.

Applicant has discovered that with a compost spreader, or other bulk material transport vehicle, it is advantageous to have a variable speed drive on the conveyor means. This allows a pile of compost which is not very tall to be picked up at a slower speed than the vehicle drives, and therefore be compacted and piled higher inside the vehicle. The variable speed also allows the material to be unloaded more slowly than the vehicle drives over the ground, and therefore dispersed or scattered over a wide area.

Further, applicant's invention presents a superior vehicle for moving cotton modules. Applicant's invention maintains an increased contact between the conveyor chains and the cotton module compared with that of previous technology. Applicant's invention also allows the module to be removed from the truck even if it becomes torn, separated, or is very loosely packed, which earlier designs do not.

(2) Objects of This Invention

An object of this invention is to provide an improved device for loading and distributing a bulk material, such as compost.

Another object of this invention is to provide a multi-purpose vehicle which may also be used to load and move cotton modules, as well as bulk materials.

Further objects are to achieve the above with devices that are sturdy, durable, simple, safe, efficient, versatile, ecologically compatible, and reliable, yet inexpensive and easy to manufacture, operate, and maintain.

The specific nature of the invention, as well as other objects, uses, and advantages thereof, will clearly appear from the following description and from the accompanying drawings, the different views of which are not necessarily scale drawings.

BRIEF DESCRIPTION OF THE DRAWINGS

FIG. 1 is a side elevational view of the invention. Parts of the truck have been omitted for clarity.

FIG. 2 is a rear elevational view of the rear end of the bed, as shown in FIG. 1.

FIG. 3 is a cross-sectional view of the front and rear ends of the bed taken substantially along line 3—3 of FIG. 2

FIG. 4 is a cross-sectional view of a single section of the conveyor system, taken substantially along line 4—4 of FIG. 3.

FIG. 5 is a top plan view of the vehicle, with the top of the vehicle omitted for clarity.

FIG. 6 is a rear partial elevational view of the spreader unit.

FIG. 7 is a cross-sectional view of the spreader located on the rear of the vehicle taken substantially along line 7—7 of FIG. 6.

FIG. 8 is a schematic representation of the drive unit on the spreader.

FIG. 9 is a schematic representation of the drive unit on the front end of the bed.

FIG. 10 is an exploded view of the tension adjustment located on the rear of the bed and visible in FIG. 4.

CATALOGUE OF ELEMENTS

As an aid to correlating the terms to the exemplary drawings, the following catalog of elements is provided:

```
20 conveyor system
22 conveyor chains
24 links
25 roller bearing
26 horizontal conveyor front and rear shafts
28 sprocket wheels
30 upper surface
32 lower surface
34 ridges
36 valleys
38 conveyor bars
40 grooves
42 scraper vanes
44 pickup wheels
46 pickup wheel troughs
48 adjustable bearing mount plate
50 spreader yoke
52 pivots
54 spreader bearing
55 axis of spreader
```

-continued

```
56 spreader
58 spreader vanes
60 spreader lift arms
62 vertical flange
64 foot of bearing mount plate
66 journal collar
68 bolt slots
70 bolt holes
72 bolts
74 compression plate
76 compression plate foot
78 compression bolt
80 conveyor drive means
82 conveyor drive regulating means
84 spreader hydraulic drive means
86 spreader drive regulating means
88 spreader vane twist
90 structural crossbar
92 yoke position stops
94 wear pad
110 material hauler and distributor
112 engine portion
114 tiltable bed
116 ground engaging wheels
118 ground engaging wheels
120 frame
122 deck
124 front end of bed
126 rear end of bed
C Chain centerline
```

DESCRIPTION OF THE PREFERRED EMBODIMENT

Referring to the drawings, and particularly to FIG. 1 and FIG. 5, there may be seen a self-loading material hauler and distributor, or compost loader and spreader 110 according to this invention. Basically, the vehicle will include a cab and engine portion 112 and a tiltable bed 114. Ground engaging wheels 116 and 118 are connected to the vehicle by frame 120.

Although applicant's invention is designed to be permanently mounted to a truck, it will be understood that it could also be constructed as a stand-alone trailer unit which would be hitched to a tractor or other towing vehicle.

The bed 114 is pivotally mounted to frame 120, so that the bed may be tilted to bring the rear end in close proximity with the ground. The valves, hoses, sources of hydraulic pressure, and the like necessary to cause the bed to tilt are not shown in the drawings because they are of a conventional nature and are well known to those having ordinary skill in the art.

The bed 114 includes an inner surface or deck 122. Loading conveyor 20 runs along the top of the deck. The loading conveyor is made up of a plurality of conveyor chains 22. Although any number of chains may be used, applicant has discovered that nine chains is the optimum number. The chains are each a continuous loop, and are composed of links 24, which are hingably connected to each other. The roller hinge includes roller bearing 25 which is inserted into the link connection point to minimize friction in travel of the chain over the deck. The chains run the entire length of the bed, from near the front of the bed 124 to the very rear end of the bed 126. The chains pass around horizontal shafts or conveyor shafts 26 at the front and rear ends of the bed. The chains engage the shaft by way of sprocket wheels 28. Power is applied by a conveyor drive means 80 to one or both of the horizontal shafts to drive the chains, thereby moving the conveyor mechanism. The speed of the drive means is varied by a regulator or regulating means 82.

The chains are oriented parallel to each other, such that they define an upper run or upper surface 30, which is located above the deck 122 and a lower surface or return 32 which is below the deck. The chain therefore runs in one direction above the deck, where the bulk material is loaded into the bed, and the other direction beneath the deck.

A plurality of conveyor bars or lugs 38 are located on the links 24. The lugs are elongated metal bars which have a channel shape. The bars are spot welded to the top of links, such that the bars are on the top of the links when the chain is on the upper surface 30. Therefore, the bars serve as scoops or grips on the chain to move the bulk material into or out of the bed, but do not interfere with the operation of the chains 22.

It will be apparent that the greater the number of bars 38, the greater the efficiency of the movement of bulk materials. Applicant has discovered that optimal placement of the bars is one bar every other link on each chain.

The surface of the deck contains ridges 34 and valleys 36, which serve to guide and channel the bulk material. The chains 22 lie within guides or grooves 40 formed by alternating elongated flanges on either side of the chain. The ridges have the cross-sectional shape of an inverted "V," but it will be understood that the ridges could have a different cross-sectional shape, for instance a rectangle or semi-circle.

The chains 22 are evenly spaced across the bed 114. The chains have a centerline distance C between chains which is measured between the centers of two adjacent chains. The proper length of bars 38 to be used depends directly on the chain spacing. Greatest efficiency and ease of movement of the load dictate that the bars should each be of a length equivalent to about ¾ of the centerline distance between chains. The bars are attached to the links at the midpoint of each bar, so that the result is that the ends of the bars on adjacent chains come closer together than about ¼ the centerline distance between chains. This provides support of a load on the bars over ¾ of the bed width.

The ridges 34 are interspersed between the chains, and have a base width greater than the gap between the ends of the bars, or in other words, the ridges have a width at their base of greater than ¼ the centerline distance between chains. The height of the ridges at their apex is just greater than the top of the bars along the top run or upper surface. Therefore, the apex of the ridge penetrates the gap between the bars, but does not impede movement of the bars. This relationship between the ridges, chains, and bars, and the spacing thereof may be seen in FIG. 2 and FIG. 3.

Two scraper vanes 42 are connected to the bottom of each bar. The scraper vanes are sized and shaped according to the shape of the gap formed by the edges of the groove, the bottom of the bar, the deck, and the surface of the ridge. The scraper vanes are made to a shape and size so as to fill most of this gap, but not touch either the deck, groove, or the ridge.

When the chains 22 move, the bulk material is picked up with the assistance of the bars 38, and is moved in the direction of travel of the chains. The ridges 34 and the scraper vanes 42 act in concert to prevent material from becoming impacted beneath the bars, and serve to carry smaller pieces of bulk material. When the machine is unloaded, for example, the presence of the vanes and the ridges assure that even the smallest quantity of compost will be unloaded from the bed, rather than left on the deck.

Pick-up wheels or disks 44 are journalled about the horizontal shaft at the rear of the bed. These wheels are spaced between the sprocket wheels and thus between the chains. The wheels are of a width less than about ¼ the centerline distance between the chains. The edge of the wheel is constructed with troughs or valleys 46, which have the same cross-section as the bars, and are spaced apart on the edge of the wheel at a circumferential distance corresponding to ½ the distance between adjacent bars on a chain. Therefore, at the rear of the bed, at the point where the bars pass over the sprocket wheels on the rear horizontal shaft, every other trough aligns with a bar and helps to fill in the gap between the bars.

Ideally, the forward horizontal shaft is powered by a conveyor drive means 80 from the drive engine of the truck. Such power transfer takes place by conventional means which are well-known in the art.

Following such power transfer takes place by conventional means which are well know in the art. The speed of the conveyor drive means is regulated by a regulating means 82. This regulating means could be a variable speed drive, but applicant has found that the optimal regulating means involves a series of gears by which the conveyor drive means is geared to the transmission of the engine portion 112. Such a regulating means allows the operator of the vehicle to vary the ratio of the speed of the chains to the ground speed of the vehicle. This allows the operator to select a forward speed on the chains equal to the ground speed on the vehicle when loading a cotton module, or to select a different speed when loading or unloading a bulk material as desired by the operator.

The rear horizontal shaft is free-turning and is held in position by one or two adjustable bearing mount plates 48 for each chain. This mount is connected to the rear end of the bed in a manner that the tension of the chain may be easily adjusted by loosening the bolts holding the mount in place, moving the mount, and re-tightening the bolts. This mount can be seen installed on the bed of the truck in FIG. 3, and an exploded view can be seen in FIG. 10.

Bearing mount plate 48 includes an elongated plate having a journal collar 66 at one end, and a foot 64 at the other end. The plate section B has four slots 68. Bolts 72 pass through holes 70 in flange 62 on the underside of the bed, at the rear, and through slots 68. The bolts are threaded into compression plate 74.

A compression bolt 78 is threaded through a foot 76 on compression plate 74, and is threaded into the foot of the bearing mount plate 64. The rear shaft is then journalled through the bearing mount collar 66.

In operation, the chains are tightened by loosening bolts 72, and adjusting compression bolt 78 until the chains are of a desired tightness. Bolts 72 are then re-tightened.

Yoke 50 is mounted to the side of the bed, at the rear end, by a pair of pivots 52. One or more spreaders are journalled to the yoke by bearings 54. The yoke may be moved about its pivots by hydraulic lift arms 60, between a lowered position, where the spreader is located just above the end of the bed, to a middle position where the spreader is away from the rear of the bed. This allows the bed to be tilted until the rear end is in close proximity to the ground without the spreader being in the way. The spreader may also be moved to a full up position, where it is out of the way of the entire rear of the bed and compartment, in order to allow a cotton module to be moved without disconnecting the spreader. The downward travel of the yoke is limited by stops 92. Wear pad 94, located on the rear outside edges of the bed, prevents wear and rubbing of the yoke against the sides of the bed. These pads are constructed of high density plastic or some other suitable material.

Yoke 50 may be disconnected from the pivots 52 at the rear end of the vehicle. This allows the yoke to be removed when the operator no longer needs the availability of the spreader unit for distributing compost. Removal of the yoke allows greater versatility when the vehicle is being used as a cotton module hauler, and also allows the tear weight of the vehicle to be lowered when hauling cotton modules. Removal of the yoke may also be necessary for interstate transportation of the vehicle according to state and federal laws.

Although the vehicle would function with any number of spreaders 54, it should be understood that applicant's optimum placement of the spreaders includes two units pivotally mounted to the yoke, one above the other. Each spreader has a plurality of spreader vanes 58. The spreader units are aligned horizontally one above the other. Structural crossbar 90 is located between the two units and serves to maintain the alignment of the yoke 50. The structural crossbar is composed of an elongated metal bar which has a diamond cross-sectional shape.

The spreader includes spreader vanes 58 which are attached at their medial end near the spreader axis 55 to a central sleeve or an axle. The vanes extend outward from the axis until they terminate in their lateral end. The vanes are normally blade-like in shape, with one side having a concavity. In order to aid in dispersing of compost, a slight twist 88 may be placed in the blades. The lateral distance which compost is dispersed from the vehicle will be proportional to the degree of twist.

Hydraulic spreader drive means 84 causes the spreader to rotate, dispersing the bulk material or compost being unloaded from the truck. The spreader drive means 84 is controlled by regulator 86, by which its rotational speed may be varied.

When two or more spreader axles and spreaders are used, each spreader may have its own drive means 84. These drive means may rotate the spreader axles in the same direction, or in opposing directions.

In operation, a compost pile at a cotton gin is moved from the gin to the field, and dispersed on the field, all with one vehicle. First, the spreader 56 is raised so that it is out of the way of the rear end of the bed 114, and the truck is backed up to the compost pile. The bed 114 is tilted so that the rear end of the bed, and the pick-up wheels 44 and bars 38 at the rear end, are in contact with the compost. The chains 22 are then engaged to move the upper surface 30 in a forward direction, while the vehicle is slowly backed up, drawing the compost pile up the chains and onto the bed. If a greater compaction of the compost is desired in the truck compared to the compost before loading, the chains may be run at a slower rate, which will enhance compaction.

Once the compost is loaded, the bed is tilted to a horizontal position, and the truck is taken to the field where it is to be unloaded. The spreader is moved down and into its low position just above the edge of the bed, and the spreader drive mechanism is engaged. The driver then drives the path over which the compost is to be spread, and engages the chains in a reverse direction to disperse the compost. The compost is carried by the bars and chains to the rear end of the bed, where it falls into the spreader, and is dispersed onto the field. The arrangement of scraper vanes and ridges allows the farmer to spread almost all of the compost on the field through the automatic spreader and conveyor means, with little or no manual labor.

When the vehicle is to be used as a module mover, the spreader 56 is swung into its most upright position, where it is out of the way of the rear end of the trailer and bed, or is removed completely from the vehicle. Module moving may operate according to conventional and well-known means.

The vehicle functions as a superior module mover, regardless of whether the spreader is attached, because of the length of the bars. Applicant's invention uses seven inch bars, with a total of nine chains. As a result, the bulk material or module being moved has 63 inches of product contact with the driven bars. Commonly used module movers all rely on at least eleven chains, having two inch bars on the chain, for a product contact of around 24 inches. Due to low contact between the chains and the load, it is easy for the chains on prior module movers to "tunnel-out" or lose their grip on the module being moved. Because of the spacing of the bars and the length of the bars, applicant's invention maintains a secure grip on the product being moved during loading and unloading.

The embodiment shown and described above is only exemplary. I do not claim to have invented all the parts, elements or steps described. Various modifications can be made in the construction, material, arrangement, and operation, and still be within the scope of my invention.

The restrictive description and drawings of the specific examples above do not point out what an infringement of this patent would be, but are to enable one skilled in the art to make and use the invention. The limits of the invention and the bounds of the patent protection are measured by and defined in the following claims.

I claim as my invention:

1. A land vehicle for the loading, transporting, and dispersing of bulk materials, said vehicle having:
    (a) a frame, at least partially supported by at least two ground engaging wheels connected to said frame, a bed pivoted to the frame, said bed including front and rear ends, and a deck on the bed forming a surface between said ends;
    (b) a conveyor system including fewer than eleven parallel chains, each of said chains having a centerline and comprising a continuous loop of links, wherein each link is connected to adjacent links by a roller hinge, said conveyor means also including at least two horizontal shafts, said chains positioned about said shafts, said chains forming an upper surface and a lower surface, said conveyor system also including a plurality of horizontal bars attached to said chains at right angles thereto;
    (c) said conveyor system mounted to said bed such that the shafts are perpendicular to a line connecting the front and rear ends of the bed, at least one of said shafts at said front end and at least one of said shafts at said rear end, wherein said upper surface is above the deck and said lower surface underneath the deck;
    (d) a conveyor drive means connected to at least one of said shafts for translating said chains in forward or rearward directions along the upper surface of the chains by imparting a rotational motion to said horizontal shafts;
wherein the improved vehicle comprises:
    (e) a plurality of elongated ridges on said deck, located parallel to said chains, and extending from an area near the front end of the bed to an area near the rear end of the bed, said ridges interspersed between said chains, and constructed so as to separate and channel bulk material in translational motion over said deck;
    (f) said bars having a length and a midpoint of the length, and said chains having a uniform distance from the centerline of one chain to the centerline of each adjacent chain;

(g) the length of said bars measuring at least about ¾ the centerline distance between chains; and (h) said conveyor system including:

(1) a plurality of sprocket wheels journalled about the horizontal shafts, said sprocket wheels engaging the links in said chains;

(2) a plurality of disks fixed about the horizontal shaft at the rear end of the bed, each disk having an edge, and a plurality of valleys located on the edge of each disk and aligned perpendicular to the radial axis of said disk;

(3) said disks interspersed between said chains;

(4) said disks rotating with the rotation of said sprocket drive wheels, such that the rotational velocity of the disks corresponds to the translational velocity of the chains.

2. The vehicle defined in claim 1 and further comprising:

(j) said conveyor drive means having variable speed;

(k) a regulating means for varying the speed of said conveyor drive means;

(l) a yoke pivotally mounted to the rear end of said bed by a pair of pivots located on the sides of said bed, said yoke including a horizontal axle extending along the width of the bed, said axle parallel to said horizontal shafts;

(m) a means connected to the bed for lifting the axle by rotating said yoke about the pivots;

(n) a rotary spreader journalled on the axle, said spreader including a plurality of spreader vanes extending away from the axle, each of said vanes having a medial end attached to a central point near the axle, and a lateral end away from the axle; and (o) a drive means for rotating said spreader, and a means for controlling the rotational velocity thereof.

3. The vehicle as defined in claim 1 and further comprising:

(p) said bars having a length of at least about five inches and a midpoint along the length, and said chains having a uniform distance from the centerline of each chain to the centerline of each adjacent chain; and (q) said bars attached to said chains at points near the midpoint of the length of the bars.

4. The vehicle defined in claim 1 and further comprising:

(l) at least nine driven chains; and (m) a pair of scraper vanes on at least one bar on each chain, said vanes located between the bar and the deck, and said vanes extending downward to an area near said deck, and extending away from the bar to a point near the ridges between the chains.

5. A land vehicle for loading, transporting, and unloading of materials, said vehicle having:

a) a frame, at least partially supported by at least two ground engaging wheels connected thereto, a bed pivoted to the frame, said bed including front and rear ends, and a deck on the bed forming a surface between said ends;

b) a conveyor system including a plurality of parallel chains, each of said chains having a centerline and comprising a continuous loop of links, wherein each link is connected to adjacent links by a roller hinge, said conveyor system also including at least two horizontal shafts, each shaft having a plurality of sprocket wheels thereon, said chains positioned about said shafts, the links of said chains engaging said sprocket wheels, said chains forming an upper surface and a lower surface, said conveyor system also including a plurality of horizontal bars attached to said chains at right angles thereto;

(c) said conveyor system mounted to the bed such that the horizontal shafts are perpendicular to a line connecting the front and rear ends of the bed, at least one of said shafts at said front end and at least one of said shafts at said rear end, wherein said upper surface is above the deck and said lower surface is underneath the deck; and (d) a conveyor drive means connected to one of said shafts for translating said chains in forward or reverse directions along the upper surface of the chains;

wherein the improved vehicle comprises:

(e) a plurality of elongated ridges on said deck, located parallel to said chains, and extending from an area near the front end of the bed to an area near the rear end of the bed, said ridges interspersed between said chains, said ridges designed so as to separate and channel bulk material in translational motion over said deck;

(f) said conveyor drive means having a variable speed;

(g) a regulating means for varying the speed of the conveyor drive;

(h) a yoke pivotally mounted to the rear end of said bed by a pair of pivots located on the sides of said bed, at least one;

(j) a means connected to the bed for lifting the axle by rotating said yoke about the pivots; and (k) a rotary spreader journalled on the axle, said spreader including a plurality of spreader vanes extending away from the axle, each of said vanes having a medial end attached to a central point near the axle, and a lateral end away from the shaft.

6. The invention as defined in claim 1 and further comprising:

(l) a drive means for rotating said spreader, and (m) a regulating means for varying the rotational velocity of said spreader.

7. The invention as defined in claim 1 and further comprising: at least one partial twist in each spreader vane, at a point between the medial and lateral ends thereof.

8. A land vehicle for loading, transporting, and dispersing of bulk material, said vehicle having:

(a) a frame, at least partially supported by at least two ground engaging wheels connected thereto, a bed pivoted to the frame, said bed including front and rear ends, and a deck on the bed forming a surface between said ends;

(b) a conveyor system including fewer than eleven parallel chains, each of said chains having a centerline and comprising a continuous loop of links, wherein each link is connected to adjacent links by a hinge, said conveyor system also including at least two horizontal shafts, each shaft having a plurality of sprocket wheels thereon, said chains positioned about said shafts, and the links of said chains engaging said sprocket wheels, said chains forming an upper surface and a lower surface, said conveyor system also including a plurality of horizontal bars attached to said chains at right angles thereto;

(c) said conveyor system mounted to the bed such that the horizontal shafts are perpendicular to a line connecting the front and rear ends of the bed, at least one of said horizontal shafts at said front end and at least one of said shafts at said rear end, wherein said upper surface is above the deck and said lower surface is underneath the deck; and (d) a conveyor drive means connected to at least one of said shafts for translating said chains in first or second directions along the upper surface of the chains by imparting a rotational motion to the shafts;

wherein the improved vehicle comprises:

(e) said bars having a length of at least about five inches, and a midpoint of the length, and said chains having a uniform distance from the centerline of one chain to the centerline of each adjacent chain;

(f) the length of said bars measuring at least ¾ the centerline separation distance between the chains;

(g) said bars attached to said chains at points near the midpoint of the length of said bars;

(h) each, at least two vertical flanges located on the underside of the deck at the front of the bed;

(i) an adjustable bearing mount plate having:
 1) at least two bolt slots for connecting said mount to the flange,
 2) a journal collar for receiving a shaft,
 3) a foot perpendicular to the plate;

(j) a compression plate, said compression plate having:
 1) at least two bolt holes,
 2) a foot perpendicular to the plate,
 3) a compression bolt threaded through a hole in the foot;

(k) at least two bolts connecting said compression plate to said flange;

(l) said bearing mount plate located between compression plate and flange;

(m) said compression screw engaging said foot on the bearing mount plate, such that turning the screw varies the distance between the foot on the bearing mount plate and the foot on the compression plate, thereby causing the bearing mount plate to be translationally moved;

(n) said rear horizontal shaft journalled within the journal collar on said bearing mounts plate.

9. A land vehicle for loading, transporting, and dispersing of bulk material, said vehicle having:

(a) a frame, at least partially supported by at least two ground engaging wheels connected thereto, a bed pivoted to the frame, said bed including front and rear ends, and a deck on the bed forming a surface between said ends;

(b) a conveyor system including fewer than eleven parallel chains, each of said chains having a centerline and comprising a continuous loop of links, wherein each link is connected to adjacent links by a hinge, said conveyor system also including at least two horizontal shafts, each shaft having a plurality of sprocket wheels thereon, said chains positioned about said shafts, and the links of said chains engaging said sprocket wheels, said chains forming an upper surface and a lower surface, said conveyor system also including a plurality of horizontal bars attached to said chains at right angles thereto;

(c) said conveyor system mounted to the bed such that the horizontal shafts are perpendicular to a line connecting the front and rear ends of the bed, at least one of said horizontal shafts at said front end and at least one of said shafts at said rear end, wherein said upper surface is above the deck and said lower surface is underneath the deck; and (d) a conveyor drive means connected to at least one of said shafts for translating said chains in first or second directions along the upper surface of the chains by imparting a rotational motion to the shafts;

wherein the improved vehicle comprises:

(e) said bars having a length of at least about five inches, and a midpoint of the length, and said chains having a uniform distance from the centerline of one chain to the centerline of each adjacent chain;

(f) the length of said bars measuring at least ¾ the centerline separation distance between the chains;

(g) said bars attached to said chains at points near the midpoint of the length of said bars;

(h) said conveyor drive means having a variable speed;

(j) a regulating means for varying the speed of said conveyor drive means;

(k) a yoke pivotally mounted to the rear end of said bed by a pair of pivots located on the sides of said bed;

(l) a means connected to the bed for lifting the yoke by rotating said yoke about the pivots;

(m) at least one rotary spreader journalled to the yoke, said spreader extending horizontally across the rear of the bed, having an axis, and including a plurality of spreader vanes extending away from the axis, each of said vanes having a medial end attached to a central point near the axis, and a lateral end away from the axis; and (n) a drive means for rotating said spreader, and a regulating means for varying the rotational velocity thereof.

10. A land vehicle for loading, transporting, and dispersing of bulk material, said vehicle having:

(a) a frame, at least partially supported by at least two ground engaging wheels connected thereto, a bed pivoted to the frame, said bed including front and rear ends, and a deck on the bed forming a surface between said ends;

(b) a conveyor system including fewer than eleven parallel chains, each of said chains having a centerline and comprising a continuous loop of links, wherein each link is connected to adjacent links by a hinge, said conveyor system also including at least two horizontal shafts, each shaft having a plurality of sprocket wheels thereon, said chains positioned about said shafts, and the links of said chains engaging said sprocket wheels, said chains forming an upper surface and a lower surface, said conveyor system also including a plurality of horizontal bars attached to said chains at right angles thereto;

(c) said conveyor system mounted to the bed such that the horizontal shafts are perpendicular to a line connecting the front and rear ends of the bed, at least one of said horizontal shafts at said front end and at least one of said shafts at said rear end, wherein said upper surface is above the deck and said lower surface is underneath the deck; and (d) a conveyor drive means connected to at least one of said shafts for translating said chains in first or second directions along the upper surface of the chains by imparting a rotational motion to the shafts;

wherein the improved vehicle comprises:

(e) said bars having a length of at least about five inches, and a midpoint of the length, and said chains having a uniform distance from the centerline of one chain to the centerline of each adjacent chain;

(f) the length of said bars measuring at least ¾ the centerline separation distance between the chains;

(g) said bars attached to said chains at points near the midpoint of the length of said bars;

(h) a plurality of disks fixed about the horizontal shaft located at the rear end of the bed, each disk having an edge, and a plurality of valleys located on the edge of each disk, and aligned perpendicular to the radial axis of said disk;

(j) said disks interspersed between said chains;

(k) said disks rotating with the rotation of said sprocket wheels, such that the rotational velocity of the disks corresponds to the translational velocity of the chains.

* * * * *